(12) United States Patent
Rupp

(10) Patent No.: US 10,215,468 B2
(45) Date of Patent: Feb. 26, 2019

(54) BLOCK ICE SHAVER

(71) Applicant: Snowie LLC, Salt Lake City, UT (US)

(72) Inventor: Carl A. Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 935 days.

(21) Appl. No.: 14/605,767

(22) Filed: Jan. 26, 2015

(65) Prior Publication Data

US 2015/0377539 A1    Dec. 31, 2015

Related U.S. Application Data

(63) Continuation of application No. 13/414,170, filed on Mar. 7, 2012, now Pat. No. 8,939,389.

(51) Int. Cl.
  *F25C 5/12* (2006.01)
  *A47J 43/046* (2006.01)

(52) U.S. Cl.
  CPC .............. *F25C 5/12* (2013.01); *A47J 43/046* (2013.01); *Y10T 83/647* (2015.04)

(58) Field of Classification Search
  CPC .......... F25C 5/12; A47J 43/046; Y10T 83/647
  USPC .... 241/36, 37.5, 91, 92, 134, 296, 297, 298, 241/DIG. 17
  See application file for complete search history.

(56) References Cited

U.S. PATENT DOCUMENTS

| | | | | |
|---|---|---|---|---|
| 1,449,917 A * | 3/1923 | Shaw | ................ | F25C 5/12 241/92 |
| 1,992,783 A * | 2/1935 | Smith | ................ | F25C 5/12 241/92 |
| 2,191,756 A * | 2/1940 | Gray | ................ | F25C 5/12 241/92 |
| 2,646,223 A * | 7/1953 | Quintilian | ................ | F25C 5/12 241/278.1 |
| 2,649,882 A * | 8/1953 | Chopieska | ................ | B02C 18/362 241/292.1 |
| 2,728,368 A * | 12/1955 | Van Guilder | ................ | A47J 43/255 241/283 |
| 4,199,112 A * | 4/1980 | McLean | ................ | A47J 43/06 241/273.2 |
| 4,575,012 A * | 3/1986 | Uphoff | ................ | F25C 5/12 241/101.2 |
| 4,655,403 A * | 4/1987 | Sciortino | ................ | F25C 5/12 241/278.1 |
| 4,718,610 A * | 1/1988 | Gallaher | ................ | A23G 9/045 241/101.2 |
| 5,050,809 A | 9/1991 | Rupp | | |
| 5,299,718 A | 4/1994 | Shwery | | |
| 5,402,949 A | 4/1995 | Berner et al. | | |
| 5,897,064 A | 4/1999 | Rupp | | |
| 6,328,236 B1 | 12/2001 | Upson | | |
| 6,394,373 B1 * | 5/2002 | Morris | ................ | F25C 5/12 241/92 |
| 6,748,853 B1 * | 6/2004 | Brady | ................ | A47J 43/0716 241/37.5 |

(Continued)

*Primary Examiner* — Anthony Stashick
*Assistant Examiner* — Onekki Jolly
(74) *Attorney, Agent, or Firm* — Terrence J. Edwards; TechLaw Ventures, PLLC

(57) ABSTRACT

The disclosure pertains generally to shave ice confection machines and processes, and more particularly to a block ice shaving apparatus, system and method whereby an improved blade and blade assembly produce more consistent output with increase machine life.

18 Claims, 19 Drawing Sheets

(56) References Cited

U.S. PATENT DOCUMENTS

| | | | | |
|---|---|---|---|---|
| 6,814,323 B2* | 11/2004 | Starr | ...................... | A47J 43/046 |
| | | | | 241/282.2 |
| 6,817,749 B2* | 11/2004 | Saunders | ............... | A23G 9/045 |
| | | | | 366/324 |
| 6,908,053 B2* | 6/2005 | Rupp | ...................... | A23G 9/045 |
| | | | | 241/86.1 |
| 7,134,620 B1* | 11/2006 | Lee | ........................... | F25C 5/12 |
| | | | | 241/37.5 |
| 7,261,537 B2* | 8/2007 | Mitz | ...................... | A47J 43/282 |
| | | | | 219/227 |
| 8,033,551 B2 | 10/2011 | Tatomir | | |
| 8,939,389 B2 | 1/2015 | Rupp | | |
| 2002/0053616 A1 | 5/2002 | Rupp | | |
| 2002/0079393 A1 | 6/2002 | Karkos, Jr. et al. | | |
| 2005/0170054 A1* | 8/2005 | Czark | ...................... | A23G 9/12 |
| | | | | 426/518 |
| 2006/0043222 A1 | 3/2006 | Lee | | |
| 2006/0163396 A1* | 7/2006 | Kennedy | .................. | A47J 27/04 |
| | | | | 241/92 |
| 2008/0061174 A1 | 3/2008 | Comstock et al. | | |
| 2009/0254231 A1 | 10/2009 | Bartling | | |
| 2013/0233142 A1 | 9/2013 | Rupp | | |

* cited by examiner

FIG. 15a
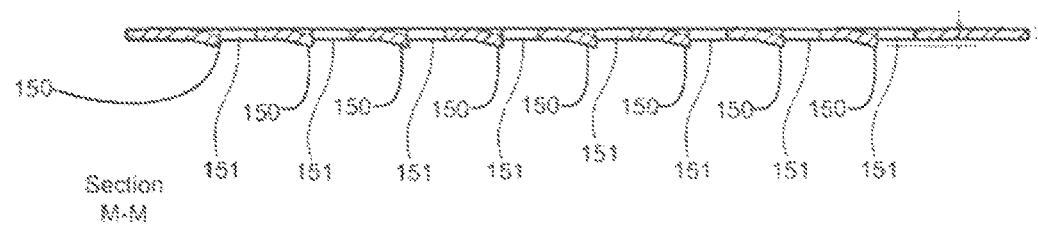
FIG. 15b

BLOCK ICE SHAVER

CROSS-REFERENCE TO RELATED APPLICATIONS

This application is a continuation of co-pending U.S. patent application Ser. No. 13/414,170, filed Mar. 7, 2012, entitled "Block Ice Shaver," which is incorporated herein by reference in its entirety, including but not limited to those portions that specifically appear hereinafter, the incorporation by reference being made with the following exception: In the event that any portion of the above-referenced application is inconsistent with this application, this application supercedes said above-referenced application.

STATEMENT REGARDING FEDERALLY SPONSORED RESEARCH OR DEVELOPMENT

Not Applicable.

BACKGROUND

This disclosure relates generally to machines for preparing shaved ice confectioneries, and more particularly, but not necessarily entirely, to a block ice shaver that is particularly adapted for producing a light, fluffy, finely textured shaved ice, or powdered snow-like flavored food products.

A variety of machines have been developed, described and are widely known for creating or processing cold deserts and confectioneries by processing ice into more appealing eatable forms, such as snow cones and shaved ice. Such devices produce either ice granules (snow cones) or light, fluffy, finely textured shaved ice for subsequent flavoring using syrups. For consistency, a block of ice can produce more appealing ice shavings than cubed ice, for example.

Despite the advantages of shaved ice machines that are available in the marketplace, improvements are still being sought. Machines in the marketplace may have limitations such as, cumbersome ice block change procedures, frozen and impacted blades, blades that do not produce light, fluffy, finely textured shaved ice, and may produce inconsistent shaved ice textures because the feeding of an ice block into a blade is inconsistent or because the machine cannot adapt to the changing consistency of the ice as the block of ice begins to warm and melt. Such machines that may use large blocks of ice tend to operate at a relatively slow rate, require significant maintenance, and are incompatible with either home use or large volume use.

Further, such machines may not be able to accommodate the changes in the texture of the block of ice as the ice begins to warm. As ice begins to warm and changes from a very cold state to a warmer state, the texture and consistency of the ice to be shaved by a machine begins to change. As the ice warms, the texture of the ice begins to degrade and the quality of the shaved ice decreases making it more difficult for the machine to shave the warm ice, or at least the ability to provide a high quality shaved ice product is decreased because of the interaction between the blade of the machine and the ice block.

Machines in the marketplace may thus be characterized by several disadvantages that may be addressed by the disclosure. The disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation and are readily apparent to those of ordinary skill in the art upon review of the following drawings, detailed description, claims and abstract of this disclosure. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIGS. 15a and 15b illustrate a side view and a side cross-sectional view of an embodiment of a blade in accordance with the principles of the disclosure;

DETAILED DESCRIPTION

Figure 1:
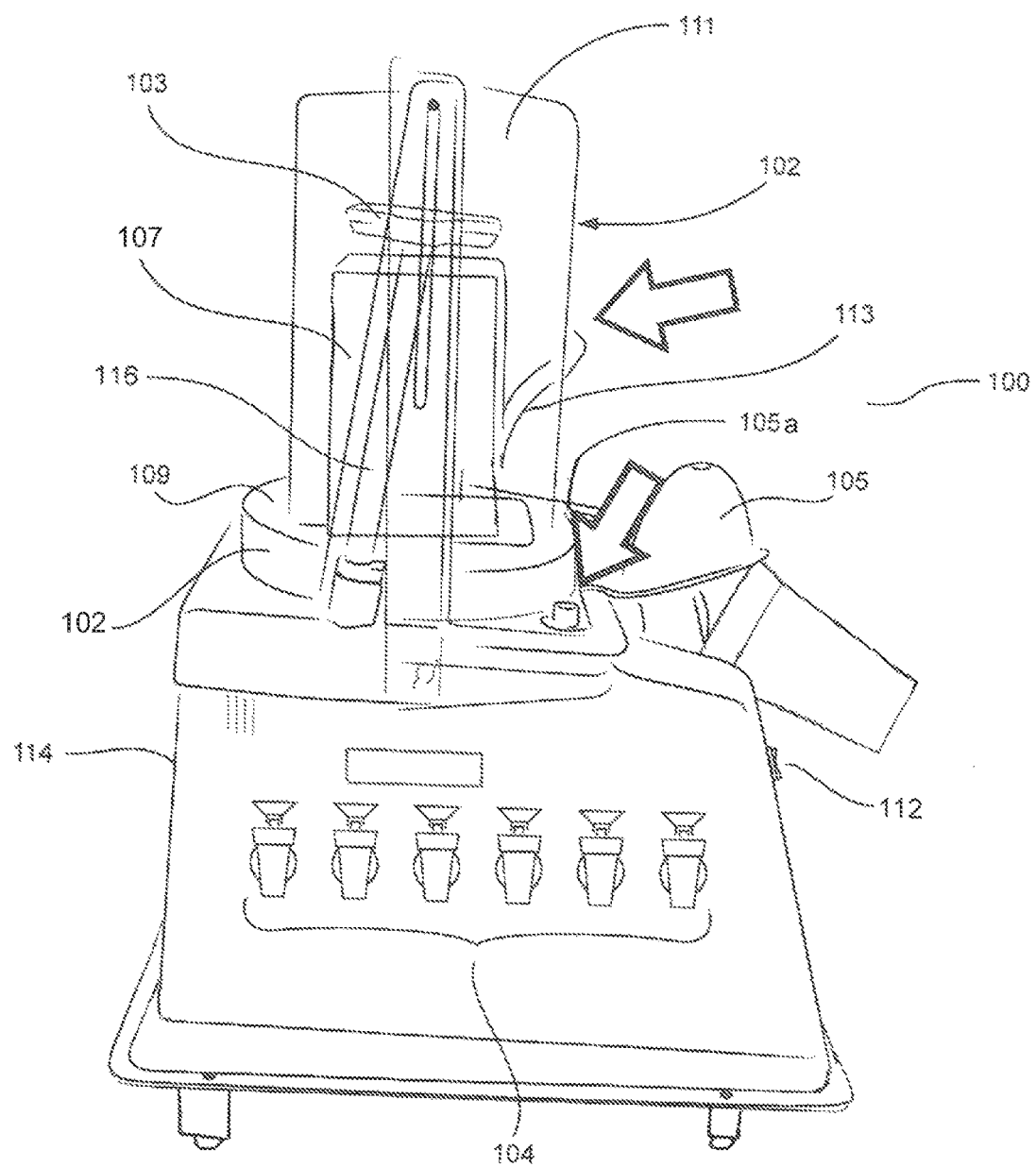
FIG. 1 illustrates a side, perspective view of an embodiment of an ice shaving machine made in accordance with the principles of the disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the apparatus, system and methods for shaving ice, such as blocks of ice, are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

The disclosure discloses an ice shaving machine for receiving a block of ice and thinly slicing such block ice to produce a powdery snow-like textured confection. It should be noted that for the purposes of this disclosure an ice block is defined as a generally homogenous solid body or mass of ice having a volume that is greater than or equal to eight cubic inches or that is larger than a typical household ice cube that may be placed inside of a user's cup to cool a drink. The ice block may be placed in a feeder, which permits the block to come into contact with a blade. The blade shaves off paper-thin slices of ice. A collector collects the paper-thin slices of ice and moves it to a spout, under which a container is placed to receive the slices of ice. Once the container is sufficiently full, flavorings may be added, either through an integrated flavor dispensing system or from an individual flavor container or from a stand-alone flavor stations having a plurality of containers. This disclosure has various embodiments and alternative blade designs, which are described in detail in the following detailed discussion.

FIG. 1 illustrates a perspective view of an embodiment of an ice shaving machine 100 of the disclosure. The machine 100 is shown having a cabinet 114, which may be made of various materials, including stainless steel, a light-weight fiberglass or plastic material without departing from the scope or concept of the disclosure, for durability and ease of cleaning. It will be appreciated that various embodiments of the machine 100 may comprise one or more of the following features: a blade assembly 310, including a blade holder 301 and a blade 101; a safety cover or blade cover assembly 102, including a spout 105, lid 111 and an ice block guide 113; an ice block feeder 103, including at least one drive shaft 116; a main drive motor 305 for rotating the blade assembly 310; and at least one motor 316 for actuating the at least one drive shaft 116. The machine 100 may also comprise a flavor dispenser 104.

A safety cover 102 may be attached to the top of the cabinet 114 for receiving a block of ice 107 and covering the working parts of the machine, for example the blade assembly 310. The safety cover 102 may be composed of a generally clear "lexan" plastic material, although other sufficiently hard materials may also suffice and are meant to fall within the scope of the disclosure. The safety cover 102 may have a base portion 109 for covering the blade assembly 310. The base portion 109 may be an outer shell fitting over and around the blade and blade assembly.

A spout assembly 105 may also be present and may be a separate component from the cover 102. The spout assembly 105 may comprise a domed portion for providing a domed round top of shaved ice for the produced product and may also comprise an outer shell or base portion 109 fitting over and around the blade 101 and the blade holder 301, which comprise a blade assembly 310. The spout 105 and the outer shell or base portion 109 may be in mechanical communication with each other, such that shaved ice may move from the interior of the outer shell or base portion 109 through a conduit 105a to the spout 105 for dispensing the shaved ice into a container (illustrated best in FIG. 1). It will be appreciated that the spout 105 may be shaped other than as a dome and may be part of, or separate from, the safety cover 102 and even the spout assembly. For example, the spout 105 may be in mechanical communication with the base portion 109 of the spout assembly, or the spout 105 may be attached directly to the cabinet 114 or other structural member, such that the spout 105 is not in mechanical communication with the spout assembly, without departing from the scope of the disclosure.

The spout assembly may also comprise a flap 117 that may be a flexible material, such as a plastic or other material that is durable, but pliable, to help and assist a user in making a shaved ice confection. The flap 117 may be used as a part of the spout assembly or may be a separate and distinct component. The flap 117 may be used as a guide to assist in the dispensing of the shaved ice, such that less shaved ice is lost as the shaved ice is dispensed from the spout 105 to the container. The flap 117 may at least partially wrap around the container and may be used, or operated, as a chute so that shaved ice is directed into the container as the shaved ice is dispensed from the spout 105.

Mounted to the safety cover 102 is a lid 111 that may be movably fastened to the safety cover 102. In the embodiment, an electrical or mechanical switch 112 is provided in the lid 111 safety cover 102 connection to shut off the operation of the machine 100 when the lid 111 is raised. The lid 111 may further comprise an ice block guide 113 that adds a biasing force laterally to the ice block so that the ice block will be more consistently fed into the blade 101. The ice block guide 113 may be a simple compliant type structure or may have a plurality of parts that produce a biasing force.

An ice block feeder 103 may comprise, or may be mounted or otherwise attached to, a drive shaft 116. The ice block feeder 103 may operate to contact the block of ice and place a force on said block of ice. The drive shaft 116 operates to actuate the ice block feeder 103 into contact with the ice block, thereby bringing and forcing the ice block 107 into contact with the blade 101. The ice block feeder 103 may comprise or may be mounted or otherwise attached to a single drive shaft 116 or, alternatively, to two or more drive shafts 116. When two or more drive shafts 116 are utilized, the drive shafts 116 work in unison to force, move and push the ice block into contact with the blade 101 to produce shavings of ice. The ice block feeder 103 may continuously move the ice block into the blade 101, freeing flakes or shavings of ice, which are received by the spout 105 of the blade cover assembly 102.

It will be appreciated that the blade 101 may be generally planer, generally circular, substantially flat and slotted with a plurality of slots or openings 151 (shown best in FIGS. 6, 13-15*b*). However, it will be appreciated that the blade 101 may be another geometric shape, besides circular, without departing from the scope of the disclosure. Each slot or opening 151 may have an adjacent edge 150 that may be slightly bent upwards toward the direction of the incoming ice block. This blade 101 may be made of high quality stainless steel material to maximize the blade life and reduce corrosion. Other non-corrosive high strength materials may also be used in place of stainless steel without departing from the scope of the disclosure. The blade 101 may be affixed to a blade holder 301 to form a blade assembly 310 such that the assembly can be rotated to provide more consistent ice shavings. While in use, the ice shavings fall through the blade 101 by way of the slots 151 and into a collection area where the shavings are moved toward the spout 105 and are then available to be dispensed as desired into a container. Once a sufficient quantity of ice shavings are collected in a container, flavoring may be added as desired.

A flavor dispenser 104 may be provided. In an embodiment of the disclosure 100, flavor selection switches may be provided on the front of the cabinet 114. The flavors may be provided by a plurality of inverted bottles or other containers (not shown), which may be fitted to receptacles on the top of the cabinet 114. An automated water switch may also be provided to flush or clean the flavoring from the dispenser system. The water can also be used to dilute the concentrated flavoring. A drain pan may be provided with a drain, which may have a drain hose for handling spills.

Figure 2A:
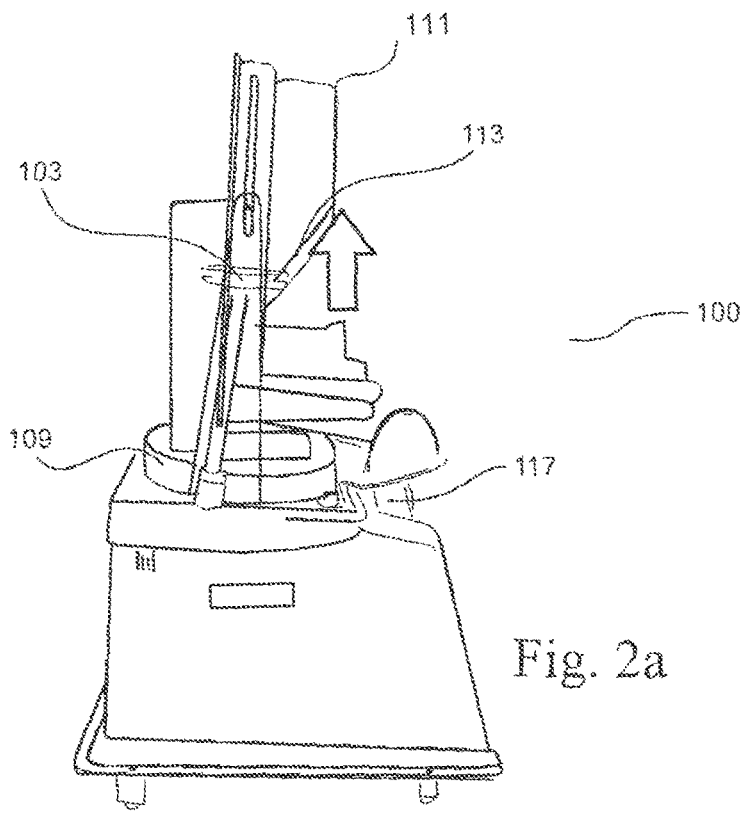
FIGS. 2a and 2b illustrate the loading of an ice block into an embodiment of an ice shaving machine made in accordance with the principles of the disclosure.
Figure 2B:
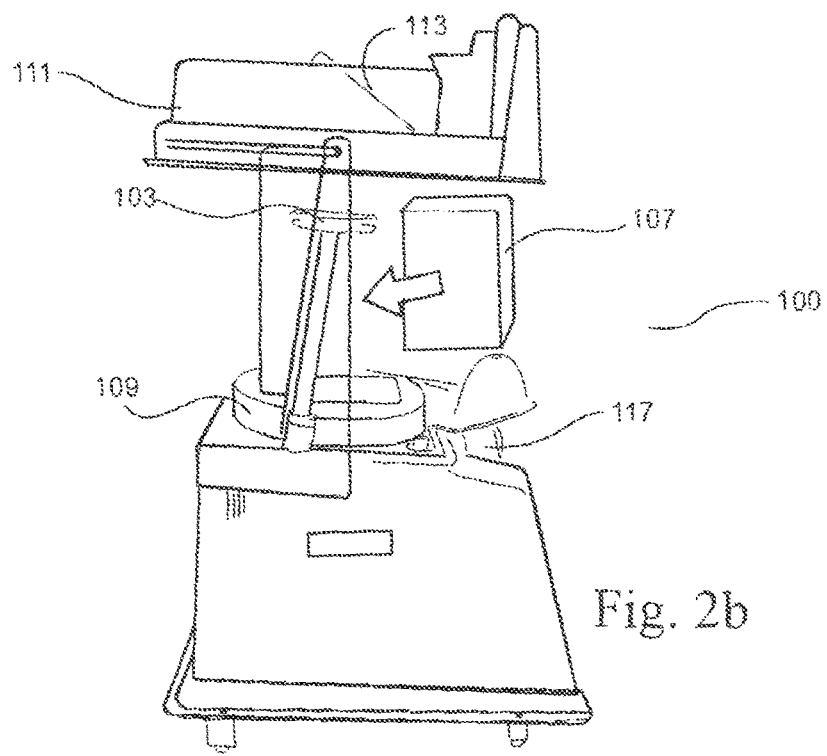

FIGS. 2*a* and 2*b* illustrate an embodiment of a block ice shaving machine 100 while it is being used. More particularly, FIGS. 2*a* and 2*b* illustrate the loading of an ice block 107 into the ice shaving machine 100. During use, a user slides the lid 111 in an upward direction to an open position. As can be seen in FIG. 2*a*, this movement is illustrated by the upward pointing arrow. In the open position, access to the ice block feeder 103 is provided and an ice block 107 can be loaded into position over the blade 101. It will be appreciated that the structural features of the cover 102 permit a user to gain access to the ice block 107, even after the ice block 107 has been loaded into the machine 100. The ability to access the block of ice 107 after being loaded into the machine 100 may be advantageous for several reasons, including the ability to clear blocked shaved ice from the blade 101 or the spout assembly 105 or removing unused portions of the block of ice and potentially others. Some machines that are available in the market do not allow or otherwise permit access to the ice once it is loaded into the machine. The result of those machines is that time and effort may be wasted while the machine either works to clear itself of frozen or otherwise stuck shaved ice, or simply shaves the excess ice that is loaded in the machine as waste product.

The ice block feeder 103 may be raised automatically or manually to allow the insertion of an ice block 107 into an opening or space between the ice block feeder 103 and the blade 101. An electronic switch may be provided to control the position and travel of the ice block feeder 103. The electronic switch, whether a toggle switch or a rocker switch, may control at least one electric motor 316 (illustrated best in FIG. 3) in order to raise and lower the ice block feeder 103. A voltage regulator/transformer may receive AC power via a standard three prong power cord and produces DC electric power for the motor 316. Between the voltage regulator/transformer and the motor 316 may be a speed controller, which includes a motor speed selection dial (not shown). The voltage regulator/transformer may be connected via an electric connection to the speed controller, which in turn, is connected to the motor 316. The motor may be a DC motor capable of turning the shaft at between 400 and 500 rpm. Alternatively, it is contemplated that an AC motor capable of 1100 rpm may be substituted. Other motor configurations can be substituted without departing from the concept of the disclosure. The motor 316 may be connected to one or more drive shafts 116 to drive the ice block 107 into the blade 101 at a predetermined rate and at a predetermined pressure.

One embodiment may comprise an ice block feeder 103 that drives the ice block 107 within a range at about 180 to about 220 lbs. of pressure. In another embodiment, an ice block feeder 103 may apply more or less pressure than previously stated in the range, and may further use gravity and the mass of the ice block 107 itself to feed the ice block 107 into the blade 101. As can be seen in FIG. 2*b* the lid 111 may be rotated to lock into an open position for convenience. Other mechanisms may be employed to lock the lid 111 in an open position and are contemplated to be with in the scope of the disclosure.

Figure 3:
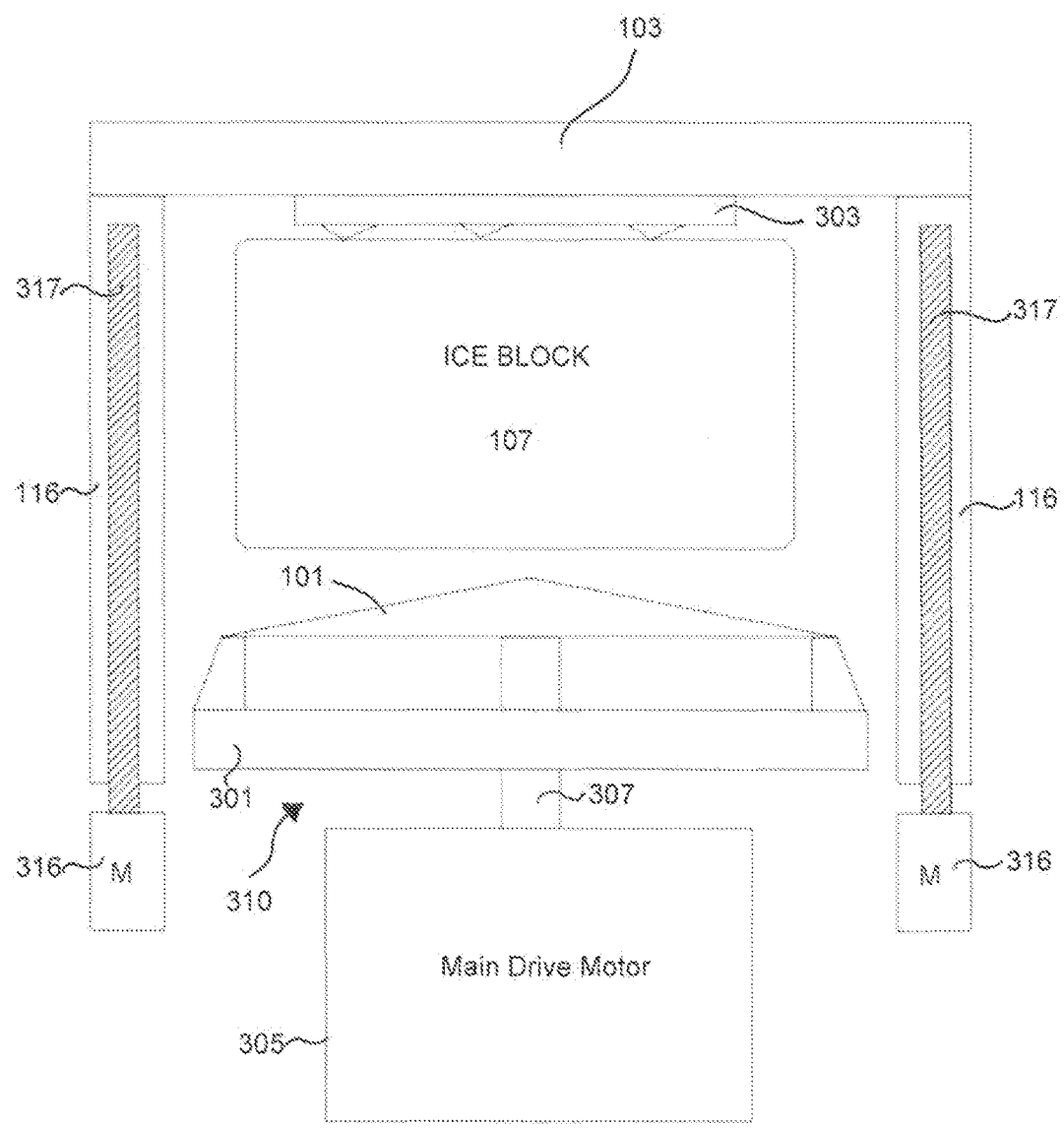
FIG. 3 illustrates a schematic view of several components of an embodiment of an ice shaving machine consistent with the principles of the disclosure.

FIG. 3 illustrates a schematic view of an ice block shaved ice machine 100. An embodiment of a block ice shaving machine 100 may comprise a main drive motor 305 that may be mechanically coupled or connected to a blade assembly 310, or directly to a blade 101, configured for shaving ice from an ice block. The mechanical coupling may be accomplished through additional structures such as gearing and pulleys or by blade holders 301. A control mechanism for activating and deactivating the mechanical drive mechanism, such as the main drive motor 305 may be used to operate the machine. For example, the control mechanism may comprise a switch device to control the main drive motor 305, which may be actuated by actuating the switch device. The switch device may be a toggle switch or a rocker switch, which may advantageously provide a safety mechanism such that there is substantially no chance of accidental bumping of the switch into an activated position. The main drive motor 305 may also be actuated using a foot pedal switch.

In an embodiment a blade 101 may be attached to a blade holder 301, and it is the blade holder 301 that may be directly attached to the drive shaft 307 of the main drive motor 305. A blade holder 301 and blade 101 may be assembled together using complementary structures to form a blade assembly 310. It will be appreciated that the blade 101 may be attached or otherwise connected to the blade holder 301 using a variety of different mechanical structures. For example, threaded inserts and fasteners, screw fasteners, key and keyhole fasteners, post or prong style snap fasteners, mechanical pins, clips or hooks, anchors, bolts, clamps, locknuts, rivets, screws and washer assemblies, or other fasteners known or that may be become known in the future may be used to attach or connect the blade 101 to the blade holder 301 without departing from the scope of the disclosure.

Figure 12:
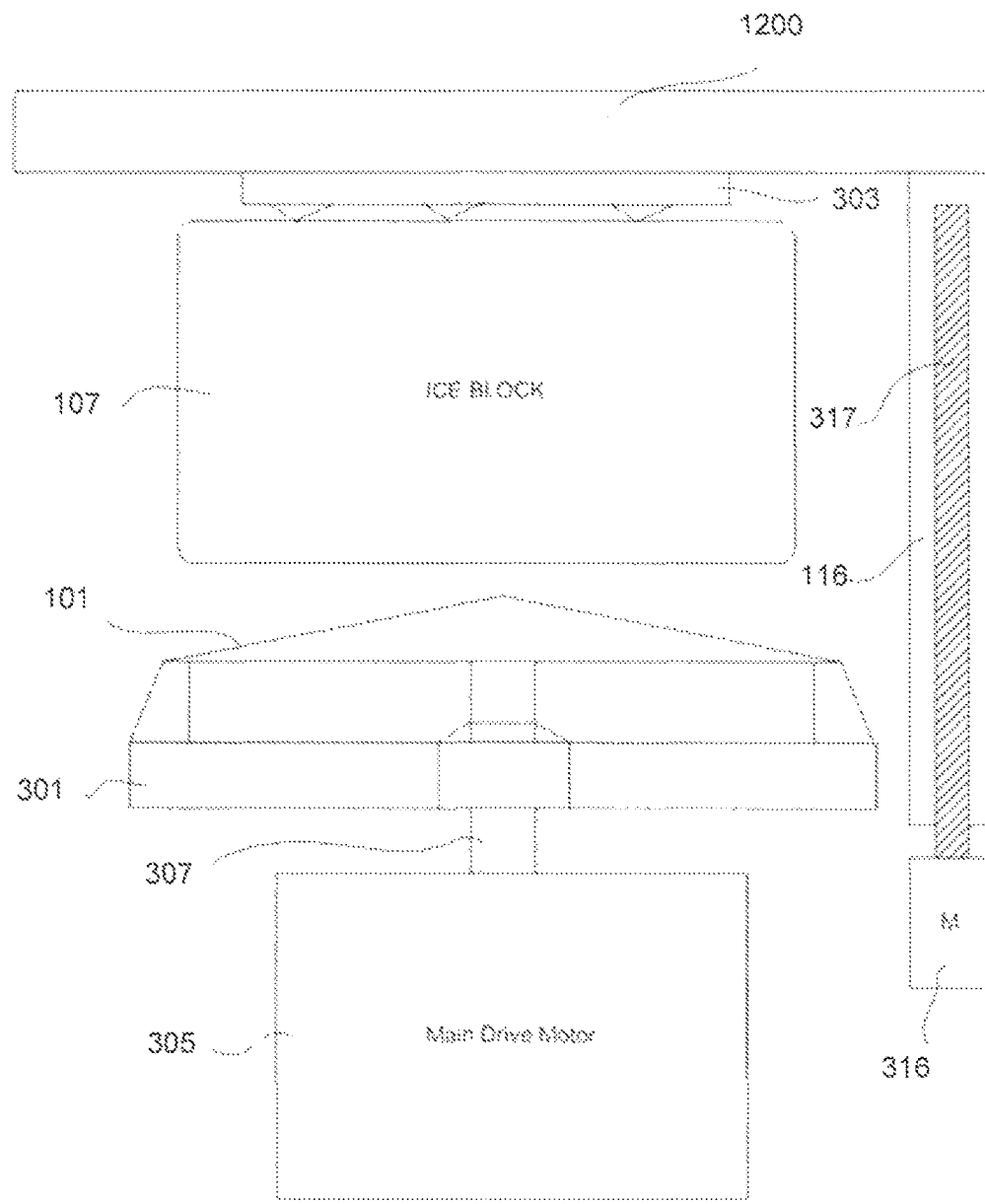
FIG. 12 illustrates a schematic view of an embodiment of an ice shaving machine having a single drive shaft for actuating the ice block feeder.
Figure 13:
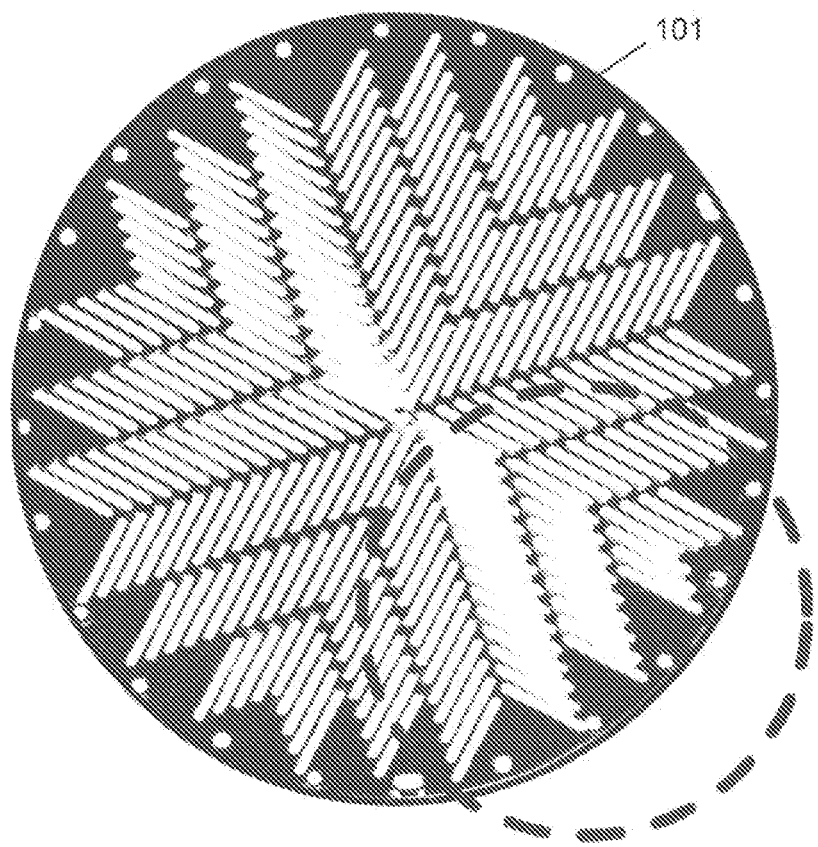
FIG. 13 illustrates an embodiment of a blade consistent with the principles of the disclosure.

An ice block shaved ice machine 100 may further comprise an ice block feeder 103 that comprises, or is connected to, one or more drive shafts 116. The drive shafts 116 may operate by way of a screw drive rod 317 that is driven by an ice block feeder electric motor 316. The drive shafts 116 may be connected one to another with a push plate 303 that actually makes contact with the block of ice 107. Electronic controls may be employed to control any block feeder electric motors 316 as well as the main drive motor 305. In an embodiment the main drive motor 305 may be mechanically coupled to the blade assembly 310 through a transmission or gear box (not shown) having predetermined operational inputs and outputs. As can be seen in FIG. 12, it is within the scope of the disclosure to contemplate an ice block shaving machine 1200 having more or less drive shafts 116. The ice block shaving machine 1200 may have a single drive shaft 116 and may have additional structures to allow the successful use of a single drive shaft 116, such as a single motor 316.

Figure 4:
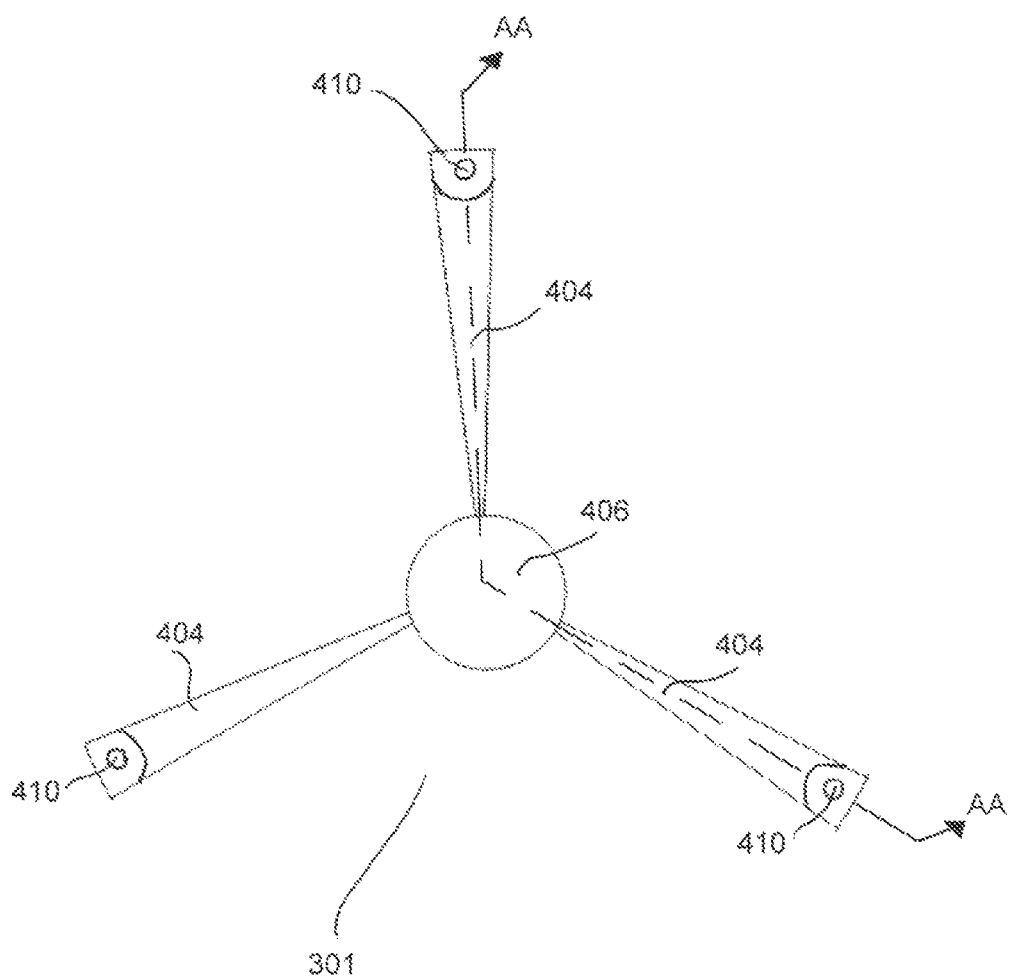
FIG. 4 illustrates an embodiment of a blade holder consistent with the principles of the disclosure.

FIG. 4 illustrates a top down view of blade holder 301 of a blade assembly 310. In the embodiment, it can be seen that blade holder 301 may comprise a plurality of arms 404. The drawings illustrate, for exemplary purposes only, embodiments having three or four arms, but it will be appreciated that the plurality of arms 404 may include two (e.g. dual arms), three, four or more arms without departing from the scope of the disclosure.

In an embodiment, and as illustrated in FIG. 4, the blade holder 301 may comprise a plurality of arms 404, for example three arms 404. The plurality of arms 404 may each radiate out from a central hub 406. At some distance from the center hub 406, a fastening or attachment structure 410 may be disposed on each of the plurality of arms 404. The fastening or attachment structure 410 may correspond with an attachment point (such as 615 in FIG. 6 or 706 in FIG. 7) of the blade 101. The fastening or attachment structure 410 may be used to fasten the blade 101 to the blade holder 301.

It will be appreciated that a radial measurement from a center of rotation of the blade holder 301, which center of rotation may be the center of the hub 406, to the attachment structure 410 of each of the plurality of arms 404 is less than a radial measurement from a center of rotation of the blade 101 to the attachment points (such as 615 of FIG. 6) of the blade 101. The result may be that the blade 101 is in a tensioned state as discussed more fully below with respect to FIGS. 8 and 9.

The center hub 406 may comprise a blade support that mechanically communicates (e.g., includes a blade supporting contact point between the blade support and the center hub 406) and interacts with the blade to control the amount of flex of the blade as a load is placed on the blade. The result may be that the blade is loaded evenly thereby reducing wear and tear on the blade, which may extend the life of the blade.

In an embodiment a blade 101 may be attached to a blade holder 301, and it is the blade holder 301 that is directly attached to the drive shaft 307 of the main drive motor 305. It should be noted that the blade holder 301 may be directly attached to a drive shaft of a motor with any manner of known means, such as complementary threaded portions, set screws or any other means known or yet to be discovered. With regard to the number of arms 404 of the blade holder 301, it may be advantageous to have enough arms 404 to control forces on the blade 101 and resist undesired rotation. For example, three arms 404, as illustrated in FIG. 4, would provide the desired stability in the typical "x" and "y" planes, such that the machine 100 will work relative to a single axis of rotation. It will be appreciated that the single axis of rotation may be a vertical axis or a horizontal axis of rotation. It will be appreciated that the single axis of rotation may be coaxial with a shaft, such as 307, of a drive motor, such as 305, in a simple embodiment. Alternatively, the single axis of rotation may not be coaxial or even parallel to a shaft, such as 307, of a drive motor, such as 305, if gearing is to be used in the machine.

Figure 5:
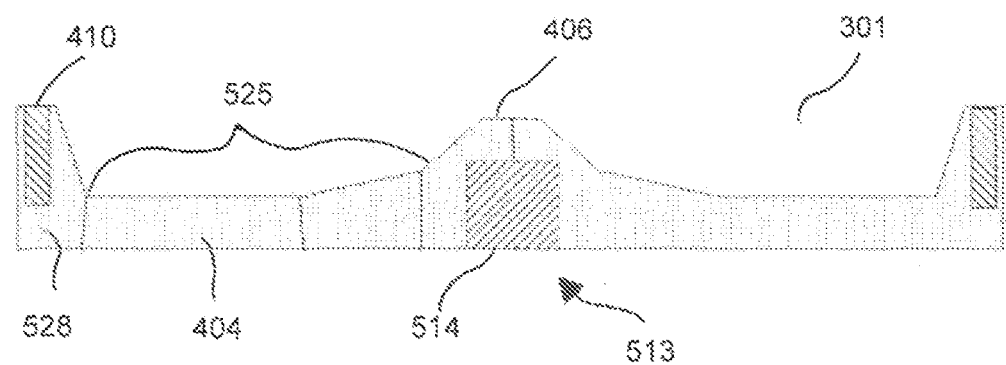
FIG. 5 illustrates a cut away view of an embodiment of a blade holder consistent with the principles of the disclosure.

Referring now to FIG. 5, the figure illustrates a cut-a-way view of a blade holder 301 defined by the cut lines AA-AA as shown in FIG. 4. In the cut-a-way view, greater detail regarding the center hub 406 is shown and which comprises a driver interface 513 having threads 514 that are schematically shown for this embodiment. A drive shaft (not shown) of an appropriate electric motor (not shown) may be inserted into the driver interface 513 and may be affixed by threading the threads 514 of the blade holder 301 onto corresponding threads on said drive shaft. The threads may be reverse threaded or traditionally threaded such that during use the blade holder 301 does not separate from the drive shaft. The blade holder may also be held with a set screw or key slot structure.

As can further be seen in FIG. 5, the plurality of arms 404 may comprise additional structures and structuring in order to provide desired functionality. For example, as illustrated in FIG. 5, a pass-through portion 525 may be provided that allows ice shavings to pass over the top of the arm 404 yet under the blade 101, such that the ice shavings can freely move and be forced into a collection area and out of the spout. The pass through portion 525 may be defined by the attachment structure 410 on one end and the hub 406 on the other end as illustrated in FIG. 5 and FIG. 11b. Referring briefly to FIG. 11b, the pass through portion 525 allows the ice shavings to easily pass over the top of the arm 1104 because of the height of the material forming the arm 1104. As illustrated in the embodiment of FIG. 11b, the arm 1104 may be formed by a sloping or tapered portion 1104a adjacent the hub 1106, which tapers in a proximal-to-distal direction with respect to the hub 1106. The tapered portion 1104a is immediately followed by a substantially planar portion 1104b. It will be appreciated that there may be a pass-through portion 525 for each of the plurality of arms 404 (illustrated best in FIGS. 5, 9-11b). Accordingly, while ice is being shaved from a block of ice, the shavings will be allowed to fall through the slots or openings 151 in the blade 101 and into a collection area that is away from the blade 101 at all points under the blade 101. It will be appreciated that the greater the surface area present on the arm, such as 404 or 1104, the more potential there is for ice build-up on the arm. Thus, it is contemplated by the disclosure to have an arm 1104 that may have a small surface area as illustrated in FIG. 11b thereby creating a larger pass through portion 525, or an arm 404 that may have a large surface area as illustrated in FIG. 5 thereby creating a smaller pass through area 525. In the embodiment in FIG. 11b, the arm 1104 is relatively petite in comparison to the hub 1106. The petiteness of the arm 1104 may allow any ice that has adhered to the material that comprises the arm 1104 to easily break off as the arm 1104 rotates, thereby continuing to permit ice shavings to pass over the arm and through the pass through portion 525.

A potential advantage of the pass through portion 525 is the ability for the ice shavings to move freely without substantial sticking, adhering, freezing to the arm of the blade holder or otherwise clogging up the machine. Allowing free movement of the ice shavings prevents clogging and freezing problems. The surface of the arms 404 may be textured or coated for decreasing icing problems. The arms 404 may further comprise a paddle portion 528 that, together with the arm structure, may help to control the movement of the ice shavings within the machine. The arms 404 may further comprise a fastening structure 410, which may include threaded openings, that may be configured to accommodate fasteners therein to attach the blade 101 to the blade holder 301 to form the assembly 310. Additionally, as can be seen in FIGS. 11 and 11a, the arms 1104 of blade holder 1110 may be curved as they radiate out from the central hub 1106. The curvature of the arms 1104 may function and work to reduce the accumulation of ice shavings on the arm 1104. It will be appreciated that the radius of curvature of one or more of the plurality of arms 1104 may provide for a greater or lesser reduction of the accumulation of ice shavings on that arm 1104.

Still further, it will be appreciated that the disclosure contemplates an embodiment wherein the arm may have a very large surface area, such that there is a very little pass through portion or substantially no pass through portion at all. In such an embodiment, substantially the entire arm operates and acts as a paddle to help move or push the shaved ice into the conduit and out of the spout assembly as the blade holder rotates.

Figure 6:
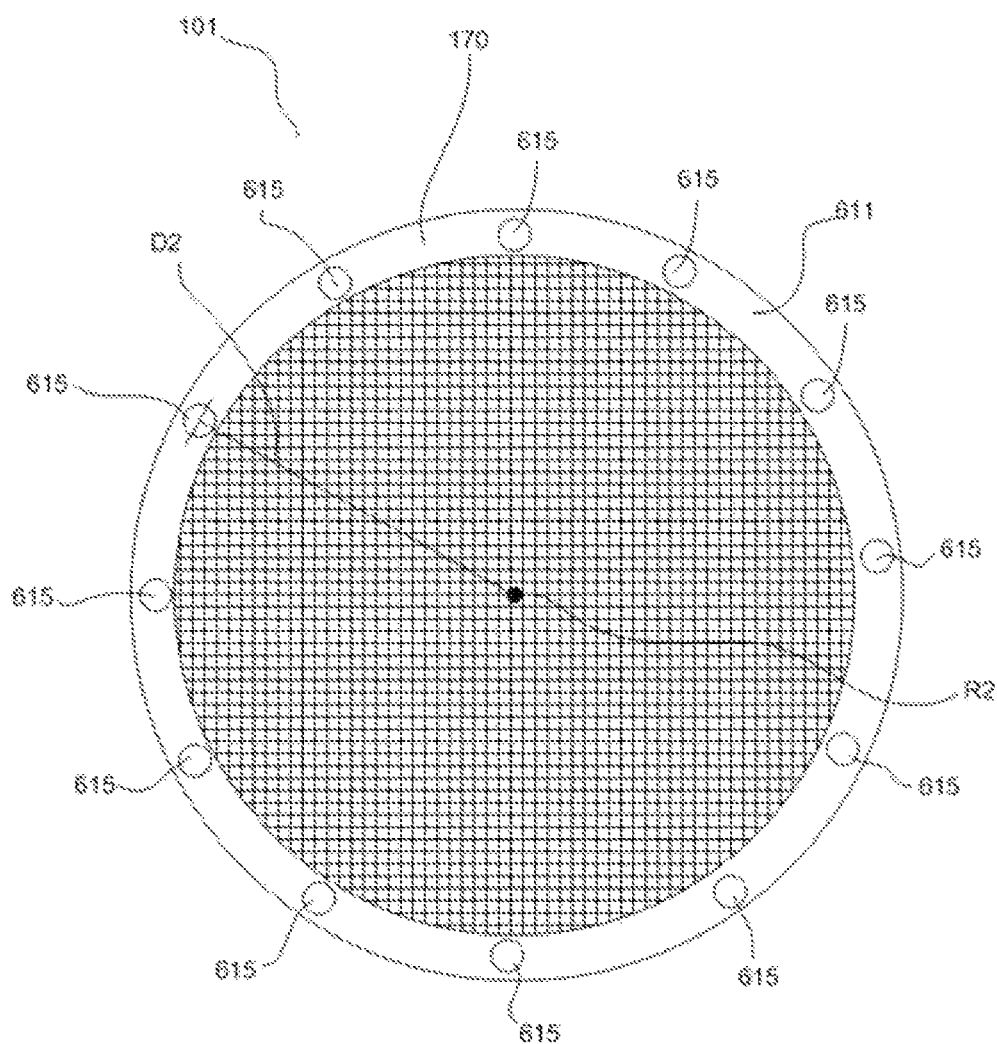
FIG. 6 illustrates a schematic, top view of an embodiment of a blade consistent with the principles of the disclosure.

FIG. 6 illustrates a schematic view of a blade 101 consistent with the principles disclosed herein. A blade 101 may be generally circular in shape and be configured to rotate about an axis that runs geometrically normal to a top surface 170 of the blade 101 and passes through the center point of the circular blade 101. However, it will be appreciated that the blade 101 may be another geometric shape, besides circular, without departing from the scope of the disclosure. The blade 101, may be generally planer, substantially flat and slotted with a plurality of slots or openings 151.

As illustrated in FIGS. 6, and 13-15b, there may be a significant number, perhaps hundreds, of slots or openings 151. Each slot or opening 151 may have an adjacent cutting edge 150 that may be slightly bent upwards toward the direction of the incoming ice block. In FIGS. 15a and 15b, which illustrate a side view and a side cross-sectional view of an embodiment of a blade in accordance with the principles of the disclosure, the cutting edge 150 is illustrated as pointing downward with respect to the page. However, it will be appreciated that the ice block may be forced into the cutting edge or blade 150 as described herein. Thus, the blade 101 illustrated in FIGS. 15a and 15b may be oriented with respect to the ice block, such that the cutting edge or blade 150 is positioned to cut into the ice block.

The blade 101 may be made of high quality stainless steel to maximize the blade life and reduce corrosion. Other non-corrosive high strength materials may also be used in place of stainless steel without departing from the scope of the disclosure. The blade 101 may be affixed to the blade holder 301 to form the blade assembly 310 such that the assembly can be rotated by a drive motor or other mechanical drive mechanism to provide more consistent ice shavings. For example, a hand crank or other mechanical drive mechanism may be used to rotate or drive the blade assembly without departing from the scope of the disclosure. While in use, whether through a drive motor or other mechanical drive mechanism, the ice shavings fall through the blade 101 by way of the slots 151 and into a collection area where the shavings are moved through a conduit toward the spout 105 and are then available to be dispensed as desired into a container. Once a sufficient quantity of ice shavings are collected in a container, flavoring may be added as desired.

The blade 101 may comprise a cutting portion 610, which may include the slots or openings 151 and the cutting edges 150, and a fastening portion 611. The fastening portion 611 may comprise radially placed attachment points 615. One or more of the attachment points 615 may be located around the perimeter of the blade 101. The attachment points 615 may be any structure that facilitates the attachment of the blade 101 to the blade holder 301 and may correspond with the fastening or attachment structure 410. In an embodiment, the attachment points 615 may be openings or holes that fasteners pass though and into the fastening structure 410 to secure the blade 101 to the blade holder 301. However, it will be appreciated that other fastening mechanisms may also be used without departing from the scope of the disclosure. For example, threaded inserts and fasteners, screw fasteners, key and keyhole fasteners, post or prong style snap fasteners, mechanical pins, clips or hooks, anchors, bolts, clamps, locknuts, rivets, screws and washer assemblies, or other fasteners known or that may be become known in the future may be used to attach or connect the blade 101 to the blade holder 301 without departing from the scope of the disclosure.

Figure 14:
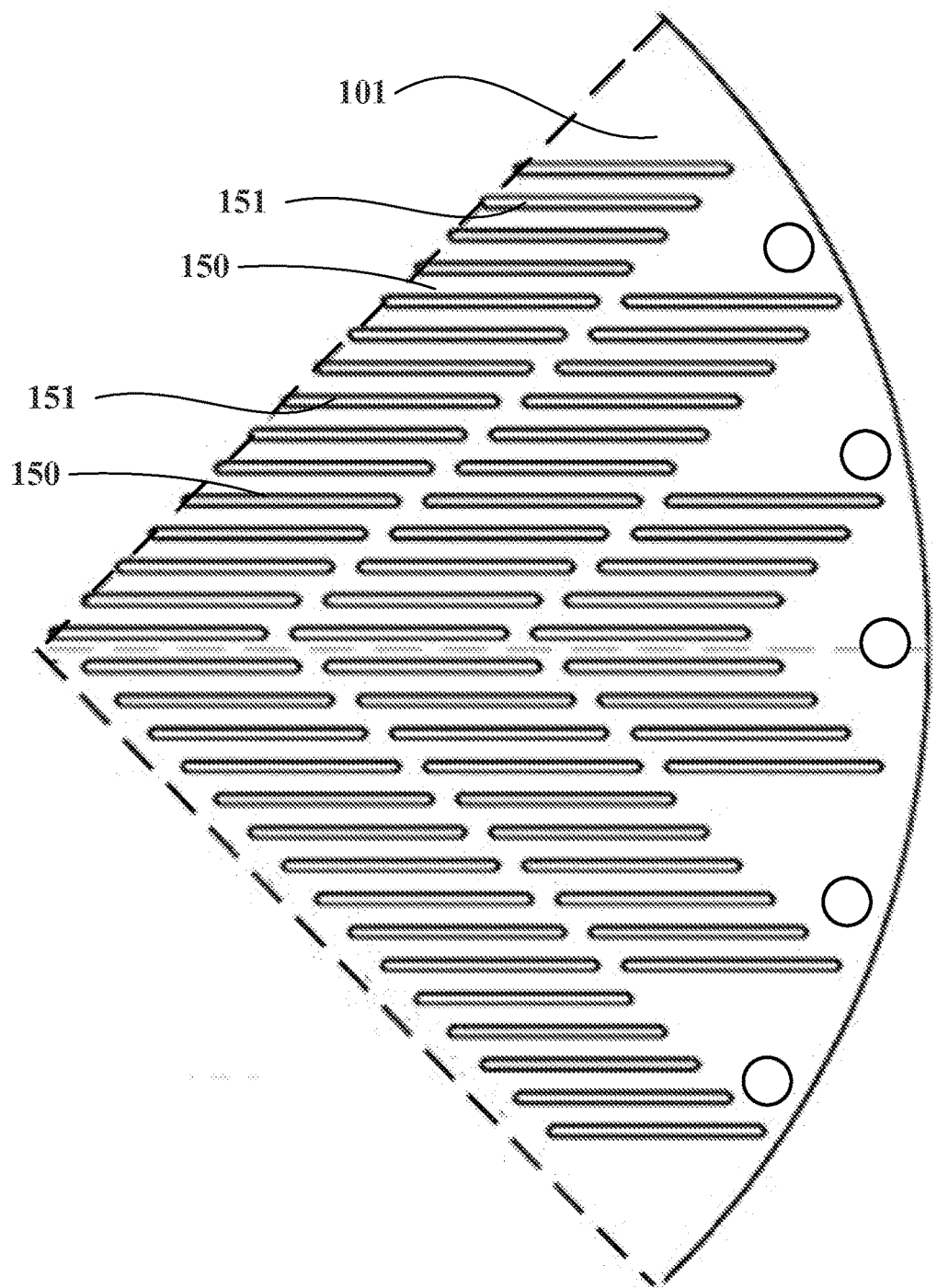
FIG. 14 is a detailed view of the embodiment of a blade illustrated in FIG. 13 illustrating the cutting surfaces and slots consistent with the principles of the disclosure.
Figure 16A:
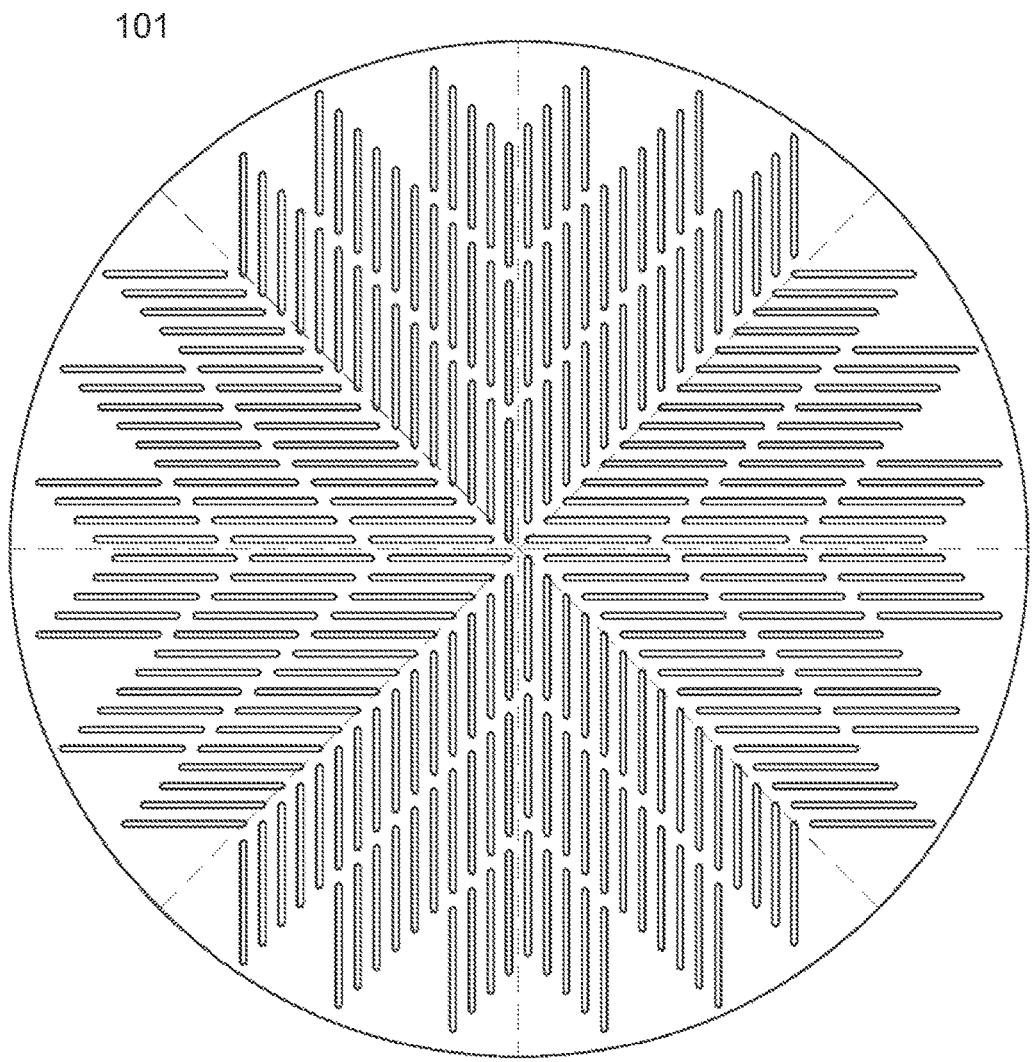
FIGS. 16a, 16b and 16c illustrate top views of various blade embodiments in accordance with the principles of the disclosure.
Figure 16B:
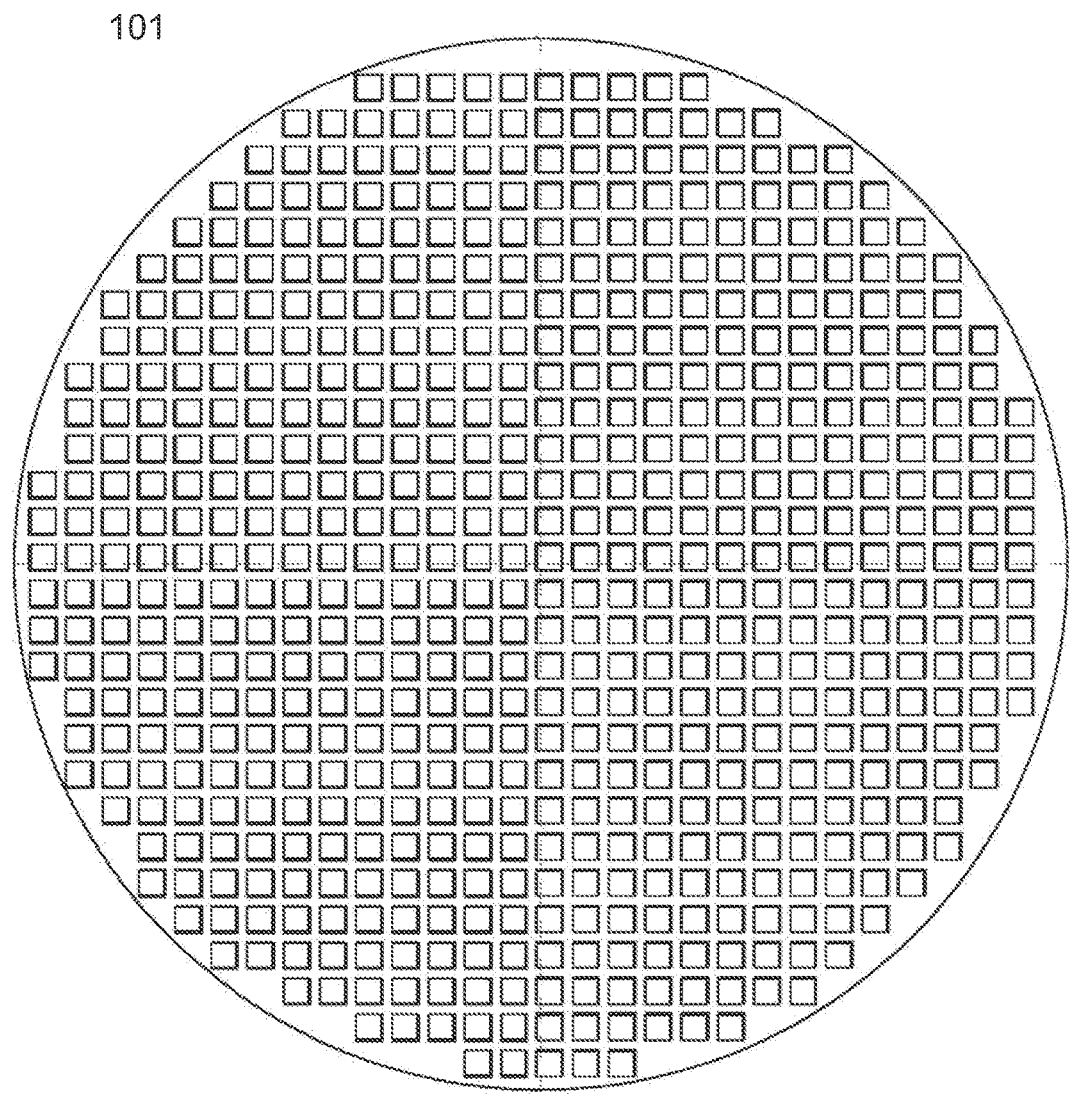
Figure 16C:
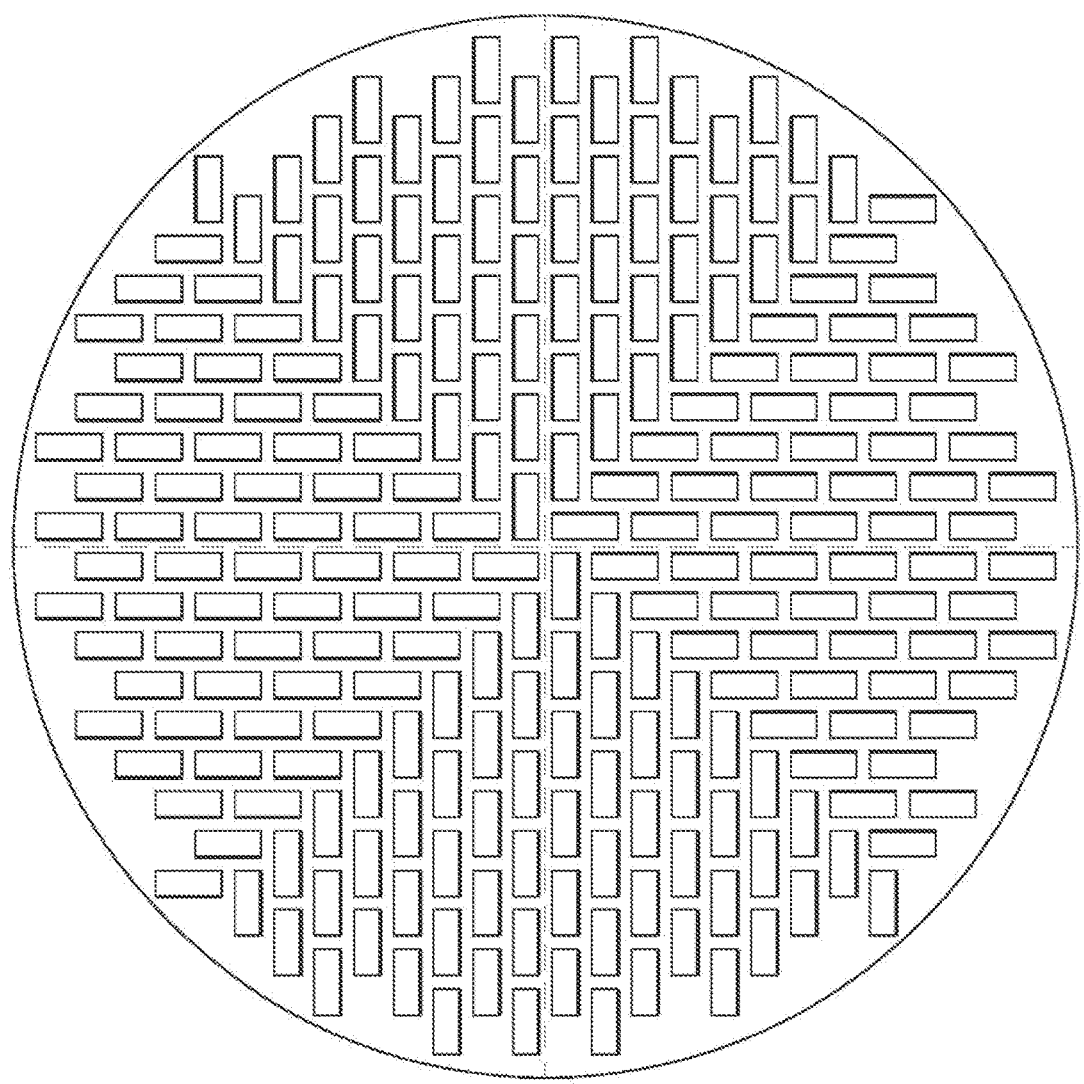

As can be seen in FIGS. 13-15b, an embodiment of a blade 101 can be seen that illustrates the adjacent placement of the raised cutting surfaces 150 relative to the slot or openings 151. FIG. 14 shows a detailed view of a portion of an embodiment of a blade 101 of FIG. 13. It should be noted that the ice shaving blade 101 may be made of many different and various configurations as far as the cutting surfaces 150 and slot 151 patterns are concerned. For example, FIGS. 16a, 16b, and 16c illustrate various embodiments of a blade 101 and examples of patterns created by the cutting surfaces 150 and slots or openings 151, which may be utilized by the disclosure.

It will be appreciated that a ratio of the surface area of the material from which the blade 101 is manufactured to the slot or opening area may be tailored or predetermined for desired shaved ice output and machine functionality. For example, the ratio may be about 25% material to about 75% opening, or the ratio may be inverted, such that there is about 75% material to about 25% opening. It will be appreciated that any ratio falling within the ranges given above are meant to fall within the scope of the disclosure, for example, the ratio may be 40% material to about 60% openings or about 60% material to about 40% openings.

An embodiment may have a blade 101 that corresponds to a blade holder 301 in which the blade 101 has more attachment points 615 than the blade holder 301 has arms 404. An embodiment may comprise a blade holder 301 having the same number of arms 404 as the blade 101 has attachment points 615. In certain embodiments, the blade 101 may be configured such that it flexes during use. Accordingly, in such embodiments the portions of the blade 101 that are adjacent to the arms 404 of the blade holder 301 may be more rigid than portions of the blade 101 that are further away from the support arms 404 of the blade holder 301. Consequently, the latter, less supported portions of the blade 101 may flex away from the block of ice during use and thus experience less wear and tear. Accordingly, it may be advantageous to rotate the blade 101 relative to the blade holder 301 (and affix the blade 101 to the blade holder 301 in an alternate position) thereby distributing the wear and tear across the whole blade surface, thereby more evenly wearing the cutting surfaces 150 of the blade 101 resulting in longer blade life.

Figure 7:
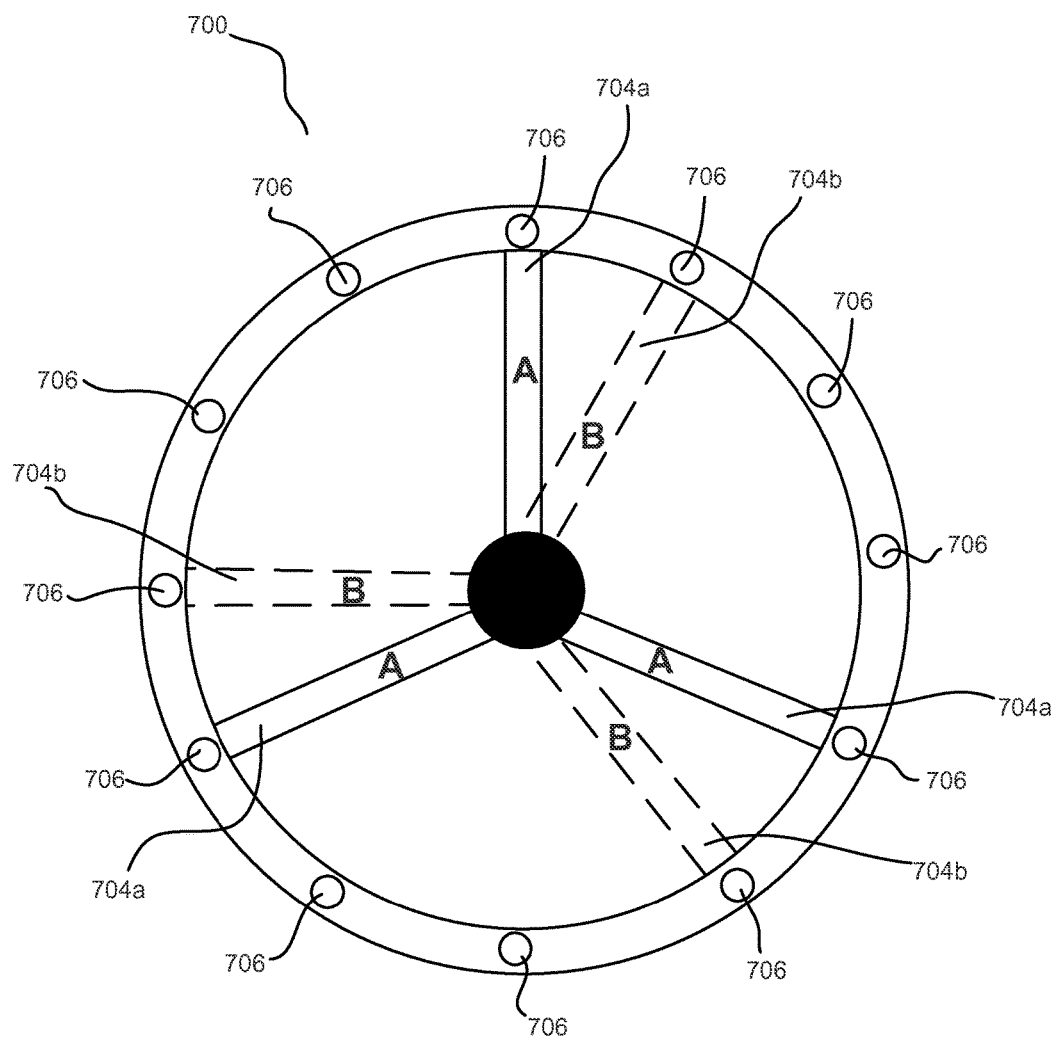
FIG. 7 illustrates an embodiment of a method and associated structures that allow the rotation of a blade relative to a blade holder in accordance with the principles of the disclosure.

FIG. 7 illustrates the feature of a blade 701 being shifted or rotated with respect to the blade holder 710 in order to prolong the life of the blade 701. As can be seen in the figure, the blade holder 710 may comprise a plurality of arms 704, for example, three arms 704, and is shown being shifted or rotated in dashed lines relative to the blade 701 in order to prolong the usable life of the blade cutting surfaces. More specifically, the arms 704a may be positioned in position "A" in the figure, which position represents a first assembled position of the blade assembly 700. The arms 704b may be positioned in position "B" in the figure, which represents a second assembled position of the blade assembly 700. As a user determines that the blade 701 is performing in an unsatisfactory manner, the blade 701 can be rotated relative to the blade holder 710 to improve function. The blade 701 may be rotated incrementally one attachment point 706 at a time or may be rotated by a plurality of attachment points 706 in order to utilize a different part of the blade cutting surfaces that have not been used as much as other portions of the blade to extend the life and usefulness of the blade as long as possible.

Figure 8:
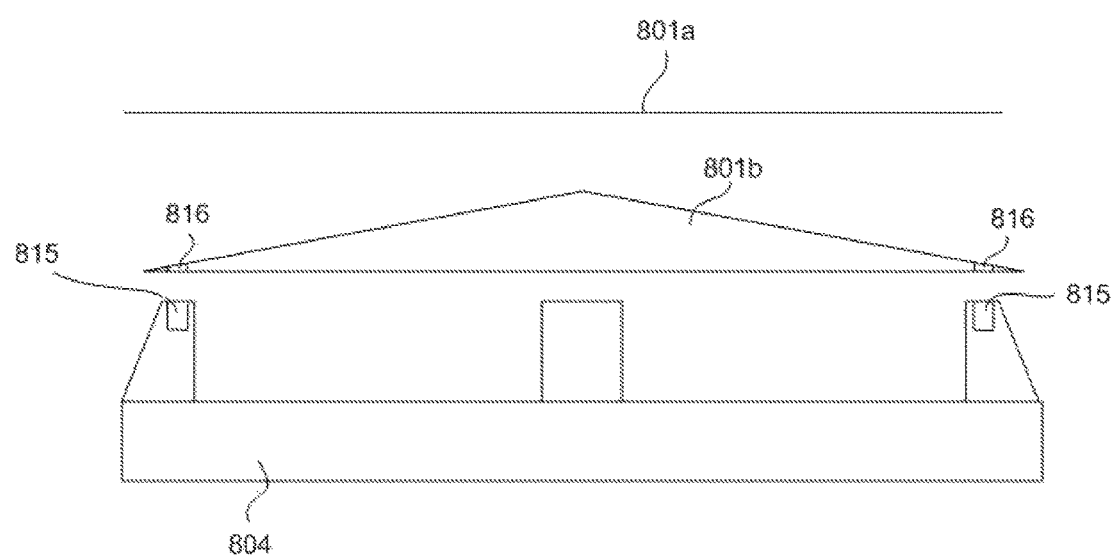
FIG. 8 illustrates the concept of tensioning of an embodiment of an ice shaving blade within a blade assembly consistent with the principles of the disclosure.
Figure 9:
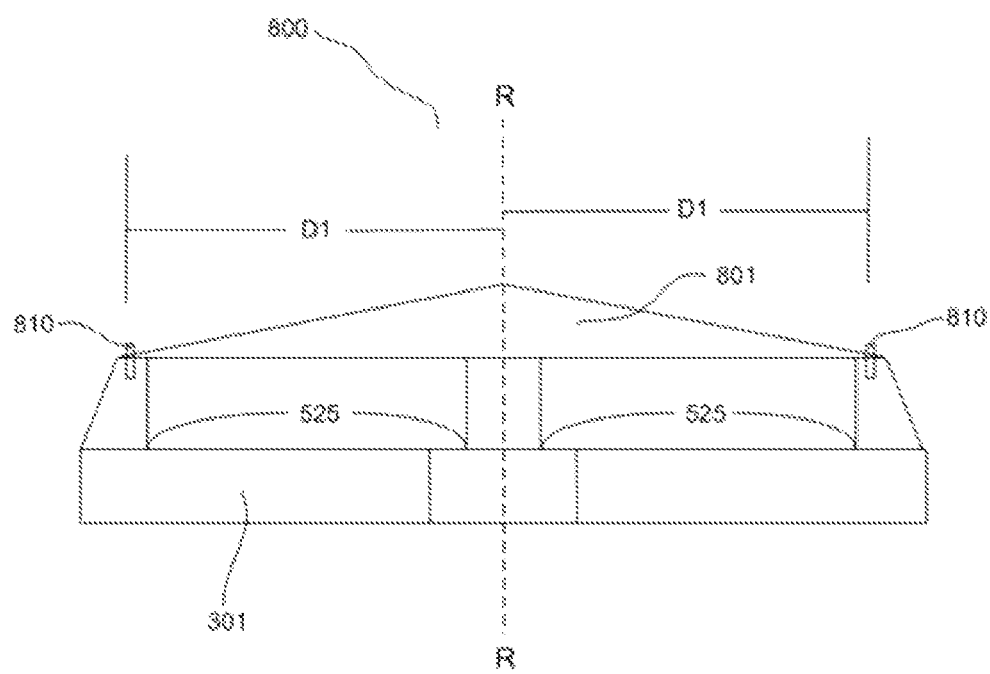
FIG. 9 illustrates an embodiment of a tensioned blade attached to a blade holder and forming blade assembly consistent with the principles of the disclosure.

FIGS. 8 and 9 illustrate the feature of a tensioned blade 801 in a blade assembly 800. In order to reduce the accumulation of unwanted ice, or ice build-up, on the blade 801, the blade 801 may be tensioned during the assembly of the blade assembly 800. As can be seen schematically in FIG. 8, the blade 801a may be relatively planer prior to assembly while it is in an untensioned state. The blade holder 810 may be configured with a distance between the mounting holes 815 on the blade holder arms 804 that is less than the distance between corresponding attachment points 816 of the blade 801.

It will be appreciated that a radial measurement D1 (illustrated in FIG. 9 and FIG. 11a) from a center of rotation of the blade holder 301 (depicted as dashed line R-R in FIG. 9), which center of rotation R-R may be the center of the hub 406 (see FIG. 9 and FIG. 11a), to the center of the attachment structure 410 of each of the plurality of arms 404 is less than a radial measurement D2 (illustrated in FIG. 6) from a center of rotation R2 of the blade 101 to the attachment points (such as 615 of FIG. 6) of the blade 101. The radial measurement D1 may be between a range of about two inches to about eight inches, or may be between about three inches to about seven inches, or may be between about four inches to about six inches, or may be about five inches. It will also be appreciated that distances or lengths of the radial measurements D1 may be modified depending upon the size of the blade 101 and safety cover 102 to be used with the machine 100. It will be appreciated that the distance or length of a diameter D3 of the blade holder 1110 may be approximately twice the length or distance of the radial measurement D1, such that the diameter may be between about four inches to about sixteen inches, or may be between about six inches to about fourteen inches, or may be between about eight inches to about twelve inches, or may be about ten inches. Due to the above mechanical properties and physical relationships, and as shown by the blade 801b in FIG. 8, the blade 801 will be placed in tension as and when it is attached to the blade holder 810. As illustrated in FIG. 9, the blade 801 is in a tensioned state when it is attached to the blade holder 810.

Referring briefly now to FIGS. 11a and 11b, the fastening or attachment structure 1110 of the blade holder 1101 may extend upwardly from the arm 1104. It will be appreciated that an angle may be formed between the arm 1104 and the attachment structure 1110 at an angle that is substantially normal to the plane in which the arm 1104 generally lies, such that the attachment structure 1110 may be aligned with the attachment points, such as 706, of the blade, such as 701, so that a fastener or other mechanical closure may secure the blade to the blade holder 1101 to thereby form the blade assembly. The attachment structure 1110 may comprise a height H1. The height H1 may be about 0.500 inch to about 3.0 inches, or may be about 1.0 inch to about 2.0 inches, or may be about 1.50 inches.

It will be appreciated that the hub 1106 also comprise a height H2, which may have a value that is equal to or larger than the height H1 of the attachment structure 1110. Thus, for example, the height H2 may be about 0.500 inch to about 3.0 inches, or may be about 1.0 inch to about 2.0 inches, or may be about 1.50 inches, when the height H2 of the hub 1106 is about equal to the height H1 of the attachment structure 1110. The height H2 of the hub 1106 may also be about 0.650 inches to about 3.150 inches, or may be about 1.150 inches to about 2.150 inches, or may be about 1.650 inches, when the height H2 is larger than the height H1. A ratio of the height H2 of the hub 1106 to the height H1 of the attachment structure 1110 may be about 1.0 to about 1.5 or may be about 1.1 to about 1.3. The difference in height values, or lack thereof, between H1 and H2 may result in a blade that can flex to a predetermined extent until contacting the hub 1106. For example, when the height H1 is substantially equal to the height H2, the blade may be able to flex to a greater degree than when H2 is larger than H1.

Figure 10:
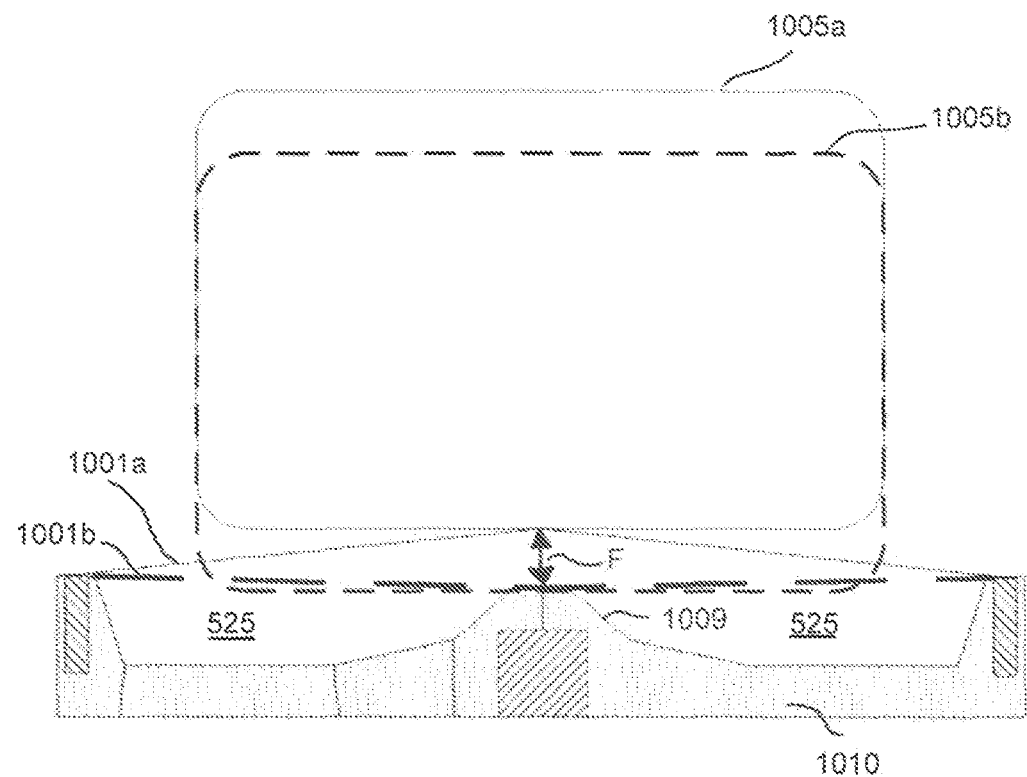
FIG. 10 illustrates the feature of a flexible blade consistent with the principles of the disclosure.
Figure 11:
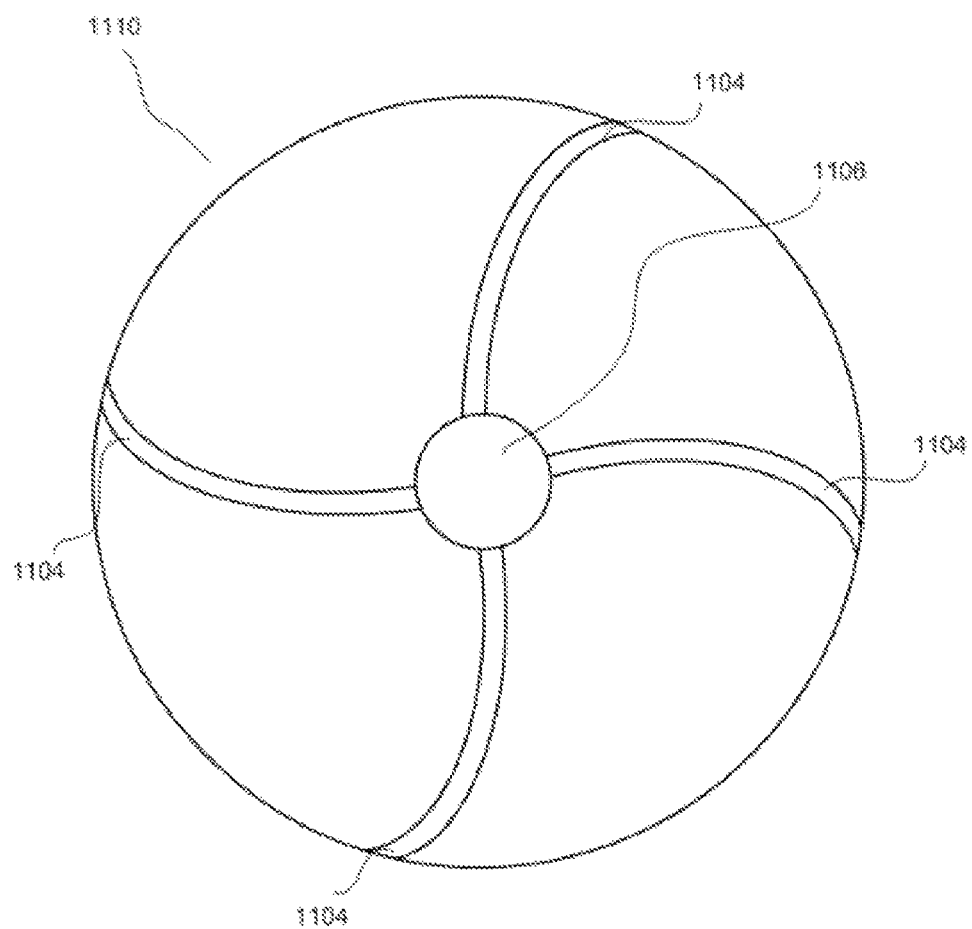
FIG. 11 illustrates an embodiment of a blade holder having enhanced features consistent with the principles of the disclosure.

Referring now to FIG. 10, the figure illustrates the feature of a flexible blade during use. In the figure it can be seen that as a block of ice 1005 is pushed into the spinning or rotating blade 1001, the blade flexes a distance represented in the figure as distance "F." In the figure, the ice block positioned and labeled at 1005a (and drawn in a solid line) represents an unloaded condition and position. As a load is applied to the ice block 1005a by an ice feeder 103 (illustrated best in FIGS. 1-3), the blade 1001a flexes to the blade positioned and labeled at 1001b (and drawn in dashed lines), which shows a loaded and flexed condition. The loads applied by the ice feeder 103 may range from the weight of the ice block itself to a considerable load of about 180 to about 220 lbs. of pressure or more (for example, 250 lbs. of pressure). Variables that can help determine the load to be applied may be such things as: the blade design, the blade material, the shaved ice rate, the limitation of ice feeder power, environmental conditions, the rotation rate of the blade and other factors.

The hub may comprise a support structure 1009 that mechanically communicates and interacts with the blade to control the amount of flex of the blade as a load is placed on the blade, such that the blade may be loaded evenly. The flex of the blade may be limited by the blade support structure 1009, which may be part of the hub or other structure, on the blade holder 1010 to prevent damage to the blade 1001. It will be appreciated that the support structure 1009 may comprise a substantially flat surface or may comprise a curved surface without departing from the scope of the disclosure. It will also be understood that the release of the load on the blade 1001 may allow the blade to move back into its original, unloaded position. When the load is released, the blade moves and experiences a "spring action," such that any built-up ice may be removed from the cutting surfaces of the blade 1001 as the blade springs back into its original, unloaded position.

It will be appreciated that the disclosure contemplates an embodiment in which the blade may be attached to the blade holder without being in tension, such that the blade does not flex. In such an embodiment, the blade may be substantially static with respect to the blade holder and hub.

Figure 17:
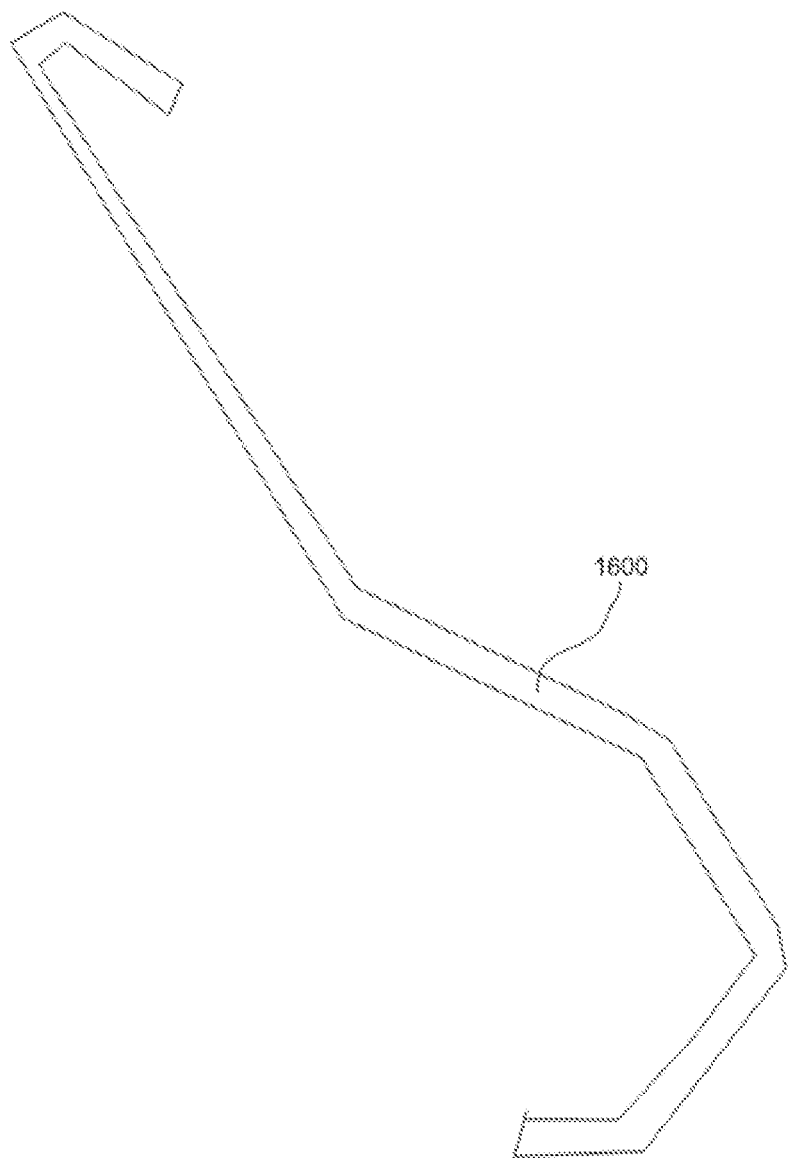
FIG. 17 illustrates and embodiment of a safety clearing tool for use with an ice shaving system disclosed herein.

FIG. 17 illustrates a tool for safely clearing blockages within an ice block shaving machine. A clearing tool 1600 may be included in a system comprising an ice shaving machine having a blade assembly.

It will be appreciated from the detailed description that it may be desirable to provide a machine for shaving a block of ice that produces light, fluffy, finely textured shaved ice, or a powdery snow-like textured shaved ice product. When shaving ice, blocks of ice provide for a more consistent, powdery snow-like texture than cubed ice, which tends to produce a grainier shaved ice product. Flavoring may then be dispensed onto the powdery snow-like shaved ice, thereby providing a confectionery product for human consumption. Block ice provides several advantages for making shaved ice, such as consistency in the outputted shaved ice product, and the volume of outputted product between ice refills.

Therefore, it is a potential feature of this disclosure to provide a machine for shaving a block of ice that produces light, fluffy, finely textured shaved ice and dispensing the shaved ice into a receiver or a container while maintaining safety of operation and efficiency of operation, such that one or more flavorings may be dispensed on the received shaved ice.

It is a further potential feature of this disclosure to provide a machine for shaving block ice into a snow-like texture, or a light, fluffy, finely textured shaved ice. Blocks of ice produce more even consistency and texture that is more like a powdery snow. The structures of the devices described and used herein above have been adapted for use with blocks of ice. Certain adaptations and improvements have been developed to handle the block ice form.

Another potential feature of this disclosure is to provide a machine for shaving ice and which provides a flavoring dispensing mechanism that permits the convenient selection of flavors. A further potential feature of this disclosure is to provide a machine for shaving ice into a confectionery and which is adapted to provide high volume shaved ice production.

It is a further potential feature of this disclosure to provide a machine for shaving ice that provides enhanced shaving speed control.

Another potential feature of this disclosure is to provide a machine for shaving ice that has an improved blade design.

A further potential feature of this disclosure is to provide a machine for shaving ice that has improved "snow" dispensing.

A further potential feature of the disclosure is to provide a machine and blade assembly for shaving ice that produces light, fluffy, finely textured shaved ice.

It is another potential feature of the disclosure to provide a machine and blade assembly for consistently producing high quality shaved ice even as the block of ice begins to warm and change consistency.

It is another potential feature of the disclosure to provide a machine and blade assembly for shaving ice without taking into account the skill of the worker to produce high quality shaved ice products, wherein the machine and the blade assembly does substantially all of the work necessary to provide a high quality shaved ice product, such that the ability and skill of the worker is not a paramount consideration.

It is to be understood that the above-described embodiments are merely illustrative of numerous and varied other embodiments, which may constitute applications of the principles of the disclosure. Such other embodiments may be readily devised by those skilled in the art without departing from the spirit or scope of the disclosure and it is the inventor's intent that these alternative embodiments be deemed as within the scope of the disclosure.

It is to be understood that the above-described arrangements are only illustrative of the application of the principles of the disclosure. Numerous modifications and alternative arrangements may be devised by those skilled in the art without departing from the spirit and scope of the disclosure and the disclosure is intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An ice shaving machine, comprising:
   a cabinet;
   a mechanical drive mechanism having a control mechanism for activating and deactivating said mechanical drive mechanism;
   a blade assembly mechanically connected to said mechanical drive mechanism, wherein said blade assembly comprises:
      a blade configured to rotate relative to a block of ice when said mechanical drive mechanism is activated, wherein said blade comprises a plurality of openings and a plurality of cutting surfaces adjacent to said openings for allowing ice shavings to pass therethrough, wherein said cutting surfaces protrude out from a surface of said blade, and
      a blade holder comprising a plurality of arms that each comprise a pass through portion and a blade attachment portion, the blade holder further configured to detachably retain said blade and couple said blade to said mechanical drive mechanism.

2. The machine of claim 1, wherein the blade deflects under load.

3. The machine of claim 1, wherein the blade holder comprises a center hub for interacting with said blade.

4. The machine of claim 1, wherein the blade is attached to the blade holder and is placed under tension.

5. The machine of claim 1, wherein a radial measurement from a center of rotation of the blade holder to an attachment structure on said blade holder is less than a radial measurement from a center of rotation of the blade to a corresponding attachment structure of said blade, thereby causing said blade to be placed in tension when said blade is assembled to said blade holder.

6. The machine of claim 2, wherein the blade is configured to spring back to its original, unloaded position when a load is removed from the blade.

7. The machine of claim 1, wherein the machine further comprises a spout assembly comprising a spout and an outer shell fitting over and around said blade, said spout assembly having a domed portion for providing a domed round top for the produced shaved ice.

8. The machine of claim 1, wherein the machine further comprises a safety cover.

9. The machine of claim 1, wherein said blade is releasably attached to said blade holder, such that said blade is positionable relative to said blade holder by detaching and rotating said blade with respect to said blade holder and then reattaching said blade to said blade holder.

10. The machine of claim 1, wherein said mechanical drive mechanism is a drive motor located within said cabinet.

11. The machine of claim 10, wherein said drive motor further comprises an electric motor and a gear box.

12. The machine of claim 1, wherein said control mechanism comprises foot pedal switch.

13. The machine of claim 1, further comprising an ice block feeder that is attached to said cabinet and comprises a drive shaft that operates to actuate said ice block feeder thereby forcing the block of ice into contact with the blade.

14. The machine of claim 13, wherein said ice block feeder includes a blade assembly which comprises dual arms for driving an ice block.

15. The machine of claim 14, wherein said dual arms for driving the ice block are driven by a motor.

16. The machine of claim 8, wherein the safety cover comprises a lid that is movably fastened to said safety cover, wherein the safety cover further comprises a safety switch to shut off the operation of the machine when the said lid is raised.

17. The machine of claim 8, wherein the safety cover further comprises an ice block guide that adds a biasing force laterally to prevent the block of ice from spinning.

18. The machine of claim 17, wherein the ice block guide is connected or attached to said lid.

* * * * *